United States Patent [19]

Nicholson

[11] Patent Number: 5,467,966
[45] Date of Patent: Nov. 21, 1995

[54] SEALS

[75] Inventor: Terence P. Nicholson, Hexham, Great Britain

[73] Assignee: Specialist Sealing Ltd., Channel Islands

[21] Appl. No.: 301,894

[22] Filed: Sep. 6, 1994

[30] Foreign Application Priority Data

Sep. 7, 1993 [GB] United Kingdom .................. 9318544
Oct. 11, 1993 [GB] United Kingdom .................. 9320910

[51] Int. Cl.$^6$ ................................................. F16K 3/10
[52] U.S. Cl. .................................... 251/174; 251/328
[58] Field of Search .................................. 251/174, 328

[56] References Cited

U.S. PATENT DOCUMENTS

| | | | |
|---|---|---|---|
| 4,085,770 | 4/1978 | Woronowicz | 251/174 X |
| 4,290,581 | 9/1981 | Moran et al. | 251/174 X |
| 5,037,064 | 8/1991 | Pond | 251/195 |
| 5,088,687 | 2/1992 | Stender | 251/174 |
| 5,170,989 | 12/1992 | Kemp | 251/175 X |

FOREIGN PATENT DOCUMENTS 2256260  12/1992  United Kingdom .

*Primary Examiner*—John Fox
*Attorney, Agent, or Firm*—Ohlandt, Greeley, Ruggiero & Perle

[57] ABSTRACT

A floating gate valve seat has an integral static seal comprising a convex arcuate limb 9 and a projecting tip 25 on the limb arranged to contact a seat pocket surface 12 and place the limb in flexing stress to effect a seal at the tip 25. A set-back stop surface 15 on the valve seat limits the compression of the seal and the axial movement and the valve seat 7.

16 Claims, 4 Drawing Sheets

SEALS

This invention relates to seals and in particular to metal seals of the so called low-load self-energising static kind, to form leakproof seals between opposed, usually plane, parallel surfaces. The invention has special application to the sealing of floating valve seats, with particular reference to seals of gate valves.

Conventionally, floating seats of gate valves are sealed with separate seal elements, usually consisting of elastomer materials, or metal seals for fire safety.

Such seals must provide satisfactory sealing between the valve gate and the valve body. They must also have sufficient resilience and to support the movement of the valve seat against the valve gate, while ensuring that perfect sealing is maintained under pressure applied from the outside diameter, and acceptable sealing is maintained under fluid pressure applied from the inside diameter.

While self-energising metal seal rings as set out for example in GB-A-2239496 and 2259121 provide excellent sealing, problems remain in practice and the use of a separate seal ring is always inconvenient.

Our GB-A-2239496 (8928648.8) describes self-energising metal seals capable of providing reliable sealing against a fluid at very high pressure, comprising a metal sealing ring which has a generally C-shaped cross section, but with the outermost region reinforced by a greater thickness of material than inner limb regions which in use engage the surfaces to be sealed. The increased material thickness in the radially outermost region and resulting increased hoop strength resist expansion of the seal in use, whereas the smaller thickness of inner regions, comprising the flexible limbs which contact the surfaces to be sealed, provides ample flexibility. Relative movement of the seal and sealed surfaces is therefore reduced or eliminated, so that the seal is not subjected to galling and roughening, but the load required to compress the seal is not substantially increased and the seal remains sufficiently flexible to accommodate misalignment and lack of parallelism of the surfaces to be sealed.

GB-A-2259121 concerns a further improved hollow metal sealing ring, applicable to situations in which there is exceptionally high pressure to seal, and/or a tendency to separation of the flanges or other surfaces to be sealed owing to the extremely high pressure. In this, the radially innermost free ends of the limb regions have axially outwardly projecting tips which provide the maximum axial dimension of the ring in its relaxed state; and the limb regions preferably have, radially external to the said projections, regions of reduced axial thickness providing points of preferential flexing of the inner ends of the limb regions during axial compression.

In accordance with one aspect of the present invention, a seat member of a gate valve, in particular a floating seat, is provided with an integral resilient seal element for sealing against the valve body or housing.

Such an arrangement is more economical than and technically superior to sealing the valve seat by means of a separate seal.

Further, in accordance with another aspect of the invention, we have found that seal profiles similar to those of the seals described above can provide extremely satisfactory sealing in other contexts, in particular valve seats, by the use of a seal element corresponding substantially to one half of the cross section of a seal ring as described above.

Thus, a body to be sealed, in particular a floating seat of a gate valve, may be provided with an integral resilient seal element, for example of annular form, comprising in cross section a resilient limb integral at one end with, and spaced over its length from the remainder of the body to be sealed. The limb has a preferably arcuate profile at least on its outer surface and is to engage a mating sealing surface under pressure exerted generally transverse to the length of the limb.

Preferably, the free end of the limb has an outwardly projecting tip or lip arranged to contact the mating sealing surface in use.

In one form of seal embodying the invention, the limb has a convergent outer surface, for example along a circular or other arc whereas the internal profile of the limb cross section comprises a surface which, in the relaxed condition, is substantially parallel to the outer surface, being connected to the main body of the member to be sealed by a smoothly blended part-circular or other arc.

One form of seal embodying the present invention will be described, by way of example only, with reference to the accompanying drawings, in which.

Figure 1:
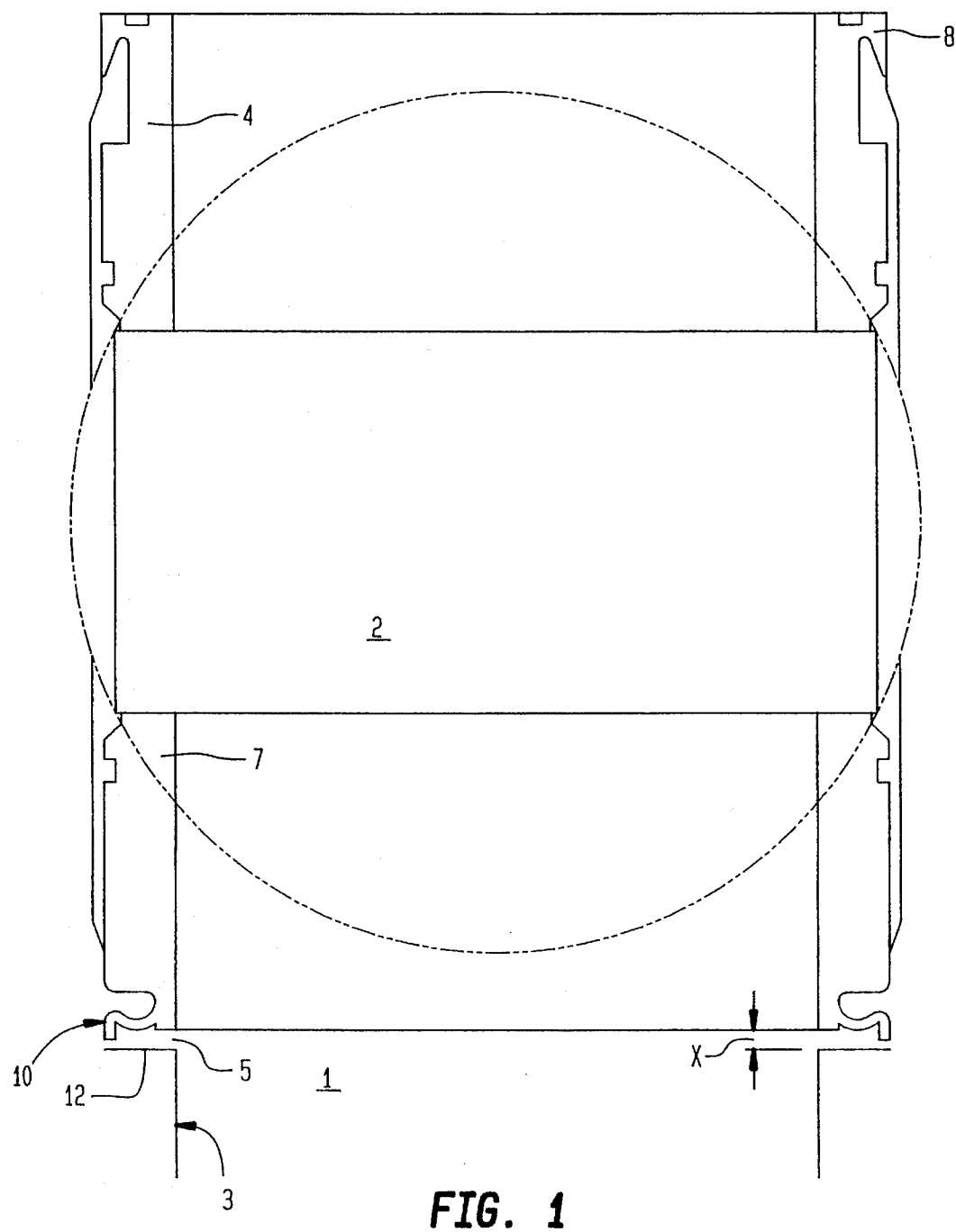
FIG. 1 is a schematic cross section of a gate valve seat.

FIG. 1 shows schematically, in axial cross section, part of a gate valve body or housing 3, comprising a flow passage 1, through which fluid normally flows in the direction of the arrow. The valve may be used for example to control flow in a natural gas or oil pipeline. At the inlet side of the valve, the flow passage 1 opens through a rectangular recess 5, or seat pocket, within which is accommodated a floating valve seat 7 of metal which seals the inlet side of the valve gate 2. At the outlet side of the valve gate is a further valve seat 4. This is a fixed valve seat, held and sealed by an integral sealing and locating lip 8, or by a C-section seal ring seated in a rectangular recess formed in the periphery of the fixed valve seat 4, and acting radially and axially between the latter and the valve housing.

The inlet valve seat 7 is a floating valve seat incorporating, at the inlet side, a seal 10 embodying the present invention. This is shown on a larger scale in FIG. 2a and 2b.

The recess 5 has a plane surface 12 perpendicular to the axis of the valve. The seal 10 comprises a resilient limb 9 integral with the seat 7 at the high pressure end of the latter and at the radially inner end of the limb. The limb is spaced by a gap 14 from a transverse surface 18 of the valve seat 7 which is parallel to the surface 12 of the valve seat pocket 5.

The fluid being conveyed may have access to the gap 14 and in this case the pressure of this fluid acts on the rear of the seal limb 9 towards the mating surface 12. The limb 9 has a circular arcuate external profile 11, so that the external surface of the limb is convex towards the mating surface 12.

The internal surface of the seal cross section is formed by a surface 21 parallel to (concentric with) surface 11 and blended into the surface by a surface 23.

The axial thickness of the metal of the limb 9 increases progressively from the crest 16 of the arcuate profile into the radially innermost region where it merges with the main body of the valve seat. This provides good hoop strength without reducing the flexibility of the limb 9.

The outer end of the limb has an axially outwardly turned tip or lip 31.

The tip 31 has a convex surface 25, facing axially the mating surface 12.

It will be observed from FIG. 2 that the surface region 25 of the limb projects axially beyond the inlet end surface 15 of the main body of the valve seat 7. In use, under axial pressure, the surface 25 contacts the mating fixed surface 12 of the valve body and the limb 9 flexes, so that it exerts, by virtue of its own resilience, sealing pressure against the surface 12.

The axially facing surface 25 of the lip 31 projects axially further beyond the surface 15 than does the arcuate surface region 16, so that when the valve seat is put under axial compression, the tip surface 25 touches the mating surface 12 first.

In operation, when pressure is applied in the primary flow direction indicated by the arrow in FIG. 1, a gap X will appear between the back face of the seat 7, and the seat pocket. Typically this gap is in the range 0.002 to 0.013 inches.

When pressure is applied from the opposite direction (for example during well testing) this gap disappears, that is to say the dimension X is 0.

The floating seal has to operate satisfactorily in both conditions, bubble tight to pressures of 5,000 or 10,000 psi. The illustrated integral seal meets these operating requirements. Typical practical dimensions are shown in FIG. 2b. The annular end surface 15 of the floating seat carries the load extended by the gate in relation to the valve body. It will be seen from FIG. 1 that this surface 15 faces and is parallel to the mating surface 12 of the valve body. The limb tip surface 25 presses resiliently against the surface 12 and causes the limb 9 to flex about its inner end. Because the surface 25 is radiused (as best shown in FIG. 2b) it can provide perfect sealing despite any possible rolling which may occur during the compression and decompression of the seal in operation.

Figure 2A:
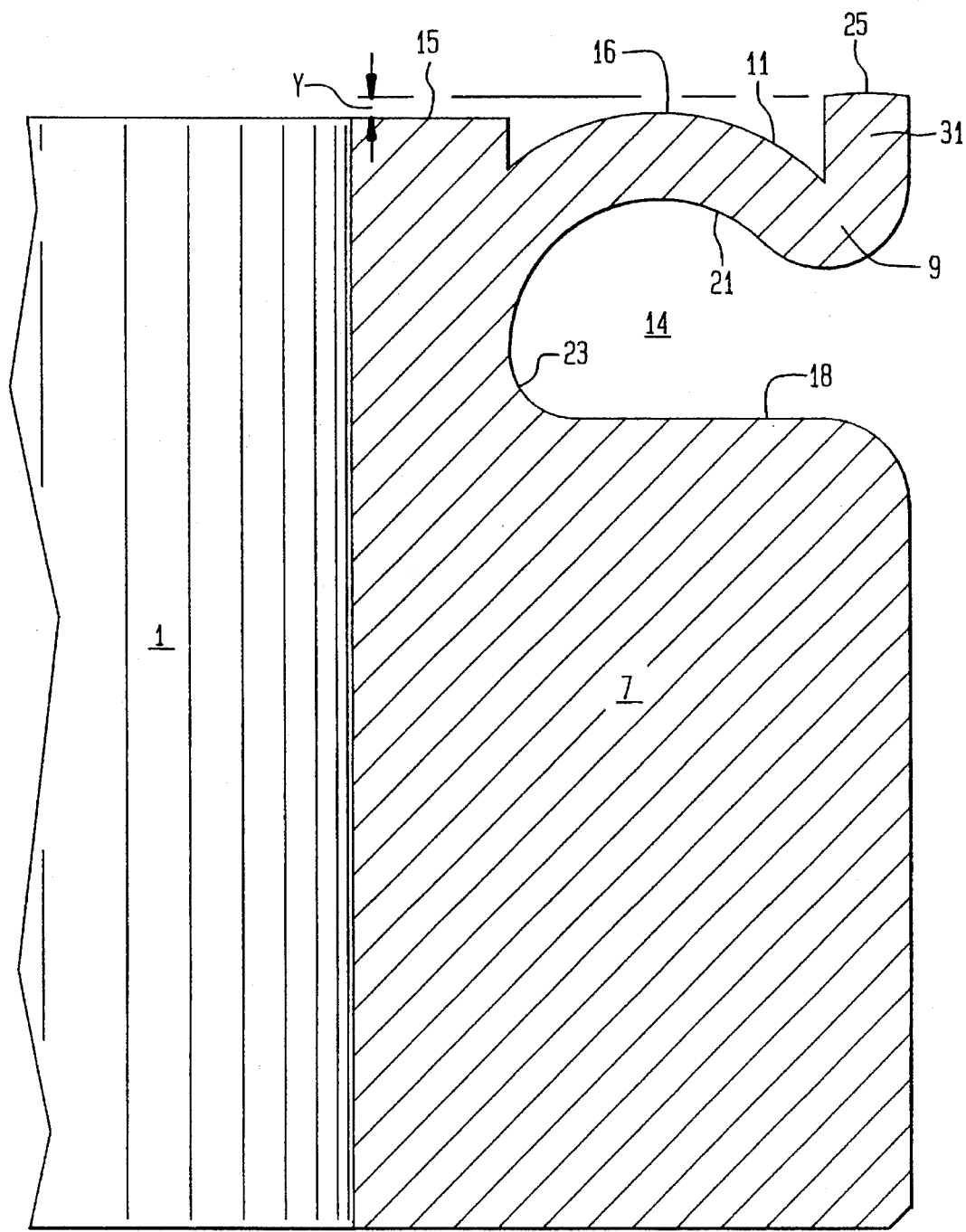
FIG. 2a shows the seal of the floating valve seat on a larger scale.
Figure 2B:
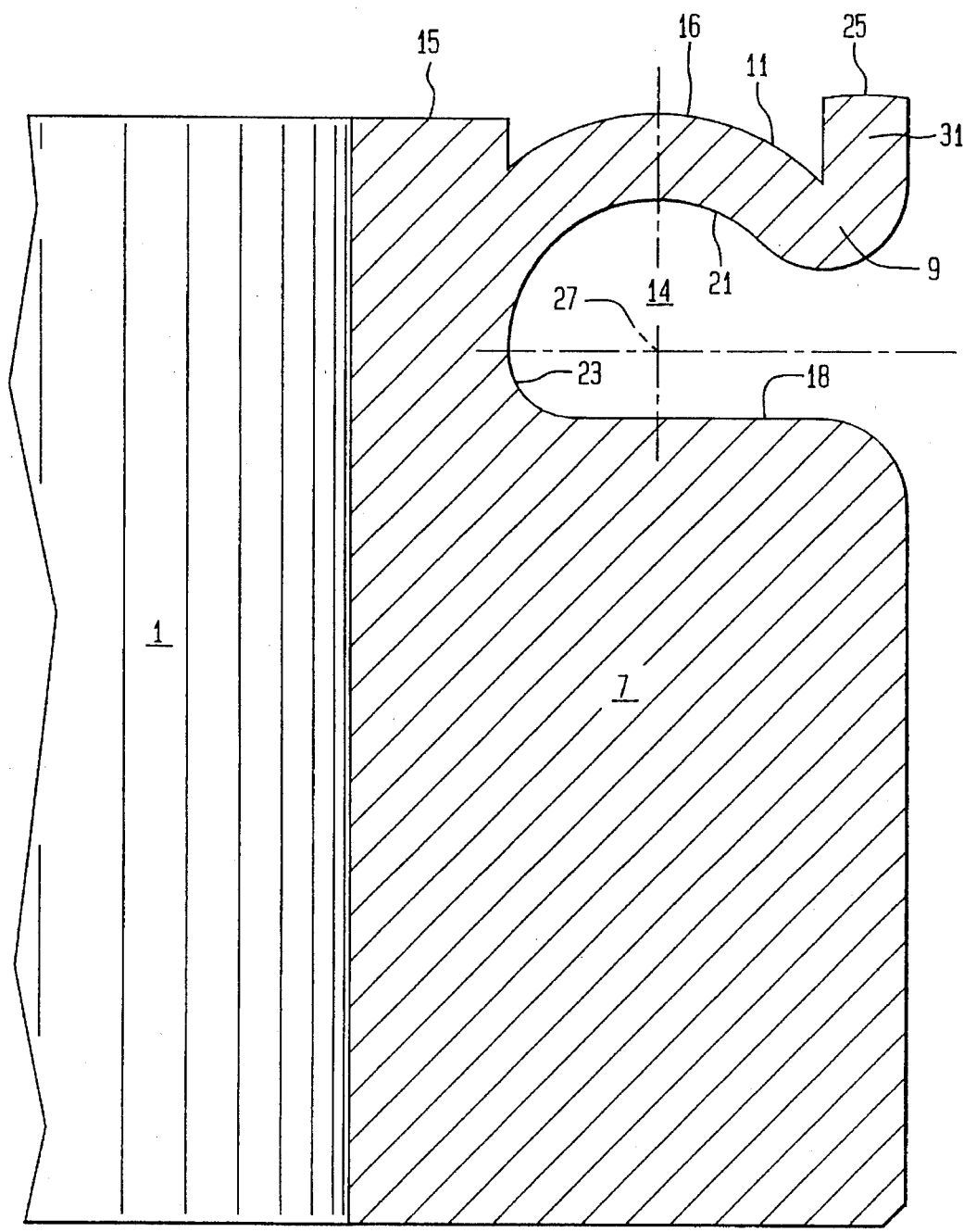
FIG. 2b shows typical dimensions of the seal profile.

In the relaxed state, the surface 25 stands forwards of the surface 15 by the dimension Y (FIG. 2a). This dimension controls the maximum compression of the seal. It can be selected according to the requirements of any particular application.

The radial thickness of the limb about its centre of curvature 27(FIG. 2b) is determined by the difference between the radii of the arcuate surfaces 16 and 21. This thickness, and its relation to the radial extent of the limb, can be selected to suit the particular application.

The convex limb can provide a perfect spring combination because of its circlip and hoop strength, resulting in constant support of the seat against the gate.

The illustrated design of a combined seat and seal for a gate valve can cope with the most rugged conditions of high pressures and corrosion, for example in sub-sea sour wells. The combination seal and seat described has very high self-energising sealing qualities.

Alternatively, the seal 10 may have a profile consisting of one half of the cross-sectional profile of a seal ring as described and illustrated in GB-A-2239496 or 2259121.

The surface 25 should be given a high surface finish and close tolerances, for example by machining and lapping.

Figure 3:
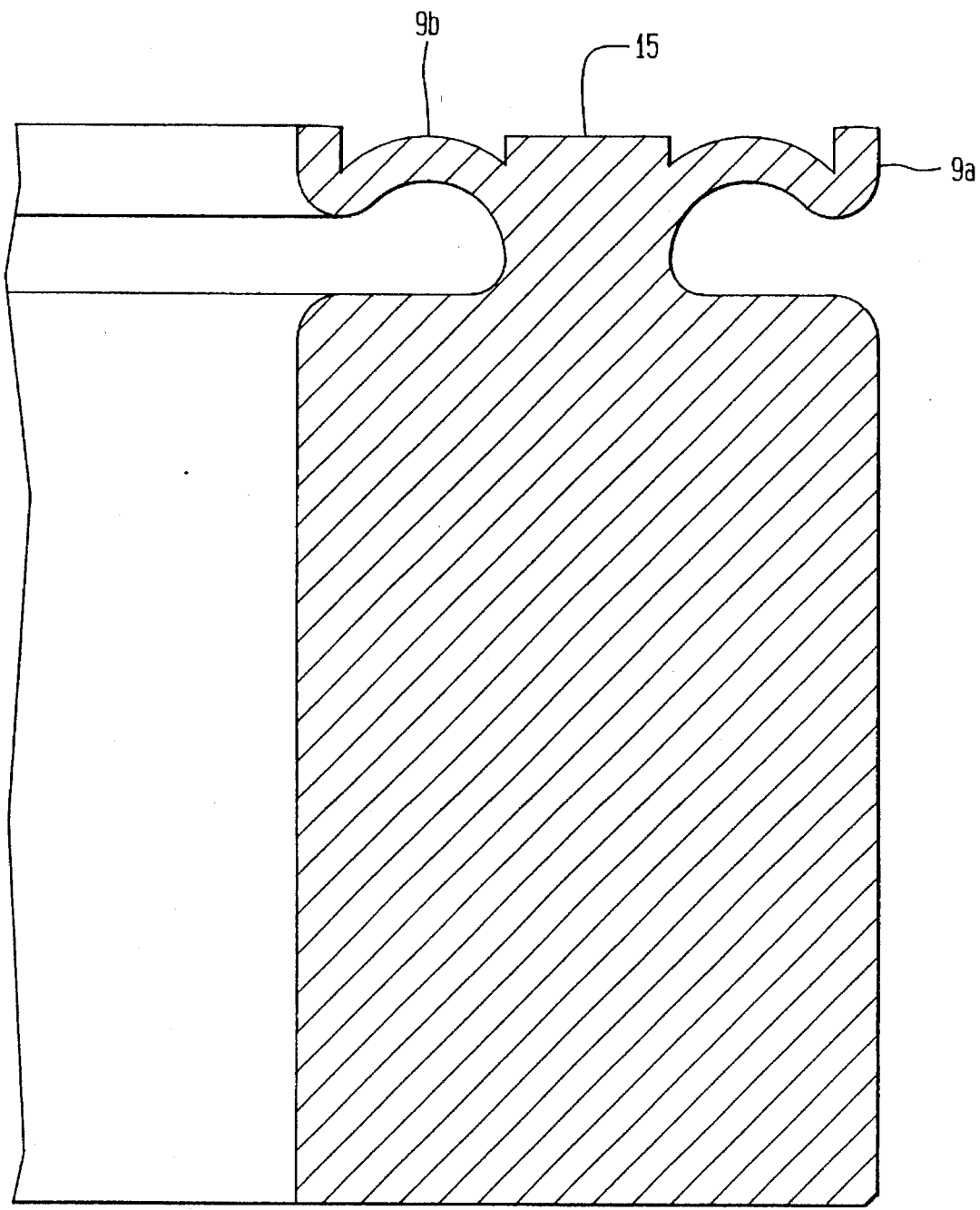
FIG. 3 shows a floating gate valve seat of symmetrical seal profile.

In the illustrated embodiment, the tip of the limb is at the radially outer extremity of the seal. Alternatively, it may be at the radially inner side of the seal, with the abutment surface 15 at the radially outer side. In yet another possible arrangement, illustrated in FIG. 3, a floating gate valve seat has a seal of symmetrical profile, comprising a first seal limb 9a at its radially outer side, corresponding to the limb 9 of the seal shown in FIGS. 1 to 2b but shorter, and a second seal limb 9b of similar profile at its radially inner side, with an abutment surface 15 between the two limbs. The inner and outer seal limbs may be mirror images of one another, in cross section, or they may differ in one or more dimensions while maintaining a similar overall shape to one another.

The present seals can be manufactured for example by machining from solid; by a combination of machining and rolling; or by initially manufacturing limb 9 as a ring and then welding it to the valve seat.

In the case of a seal of welded construction, the individual ring can be made by machining from plate, by pressing, or in any other convenient way.

Welding can for example be by TIG or micro-plasma welding, but electron beam welding is preferred owing to its lower heat input, making it possible to weld without difficulty sections having a heel thickness up to 35 mm.

Particularly in the case of a seal made by electron beam welding, it may be desirable to heat treat the seal after welding, for example by re-solution heat treatment, before any subsequent age hardening treatment.

Seals embodying the invention can be made of any suitable metal. High nickel alloys are particularly suitable, for example Nimonic (registered trade mark) and Inconel (registered trade mark). A suitable alloy for sour applications is Inconel 718.

The corrosion resistance and the spring characteristics of the seal and therefore its recovery factor after compression can be greatly improved by age-hardening.

The seal may be coated before use with a protective and/or low friction coating for example lead, silver, gold, nickel, PTFE, or a combination of nickel or other metal and PTFE. The last mentioned combination is valuable for reducing galling during compression, when an Inconel seal is compressed against an Inconel valve body or more generally, when nickel alloy seals are used in conjunction with nickel-containing or coated flanges.

In the illustrated embodiments, the valve seat is annular and accordingly the seal is annular. However, the invention is also applicable to seals of other than annular configuration, for example rectilinear or oval seals.

Although the sealing of floating seats of gate valves is a particularly advantageous application of the invention, it can be used for sealing in a wide variety of other situations, and in general for all static sealing.

I claim:

1. A gate valve which comprises:

a valve body;

a valve gate member movable slidably in said valve body;

fluid inlet and outlet flow passages in said valve body, said valve gate member being arranged for movement to selectively prevent and permit fluid flow between said flow passages; and at least one gate valve seat member located in said valve body between said valve gate member and a respective flow passage, said gate valve seat member being mounted in a floating manner in said valve body and having a first seal region arranged to make slidable sealing contact with said valve gate member and a second seal region arranged to make sealing contact internally with said valve body adjacent a respective flow passage, wherein the improvement is characterized in that:

said floating gate valve seat member incorporates an integral resilient seal element comprising, in cross-section, a resilient limb integral at one end with and spaced over its length from the remainder of said floating gate valve seat member, said resilient limb being arranged and adapted to make resilient sealing contact with said valve body and having an outer surface with an arcuate profile which is convex outwardly from said floating gate valve seat member and towards said valve body.

2. The gate valve according to claim 1 wherein said resilient limb has at its free end an outwardly projecting region, arranged and adapted to contact a mating sealing surface of said valve body.

3. The gate valve according to claim 2 wherein said outwardly projecting region, when in the relaxed state, is arranged to be the first portion of said integral resilient seal element to contact said mating sealing surface of said valve body.

4. The gate valve according to claim 3 wherein said floating gate valve seat member further comprises an abutment or stop surface, arranged and adapted to contact said mating sealing surface later than said outwardly projecting region, for limiting the deformation of said resilient limb.

5. The gate valve according to claim 1 wherein said floating gate valve seat member is of generally a tubular form.

6. The gate valve according to claim 1 wherein said resilient limb has on its inner surface, said inner surface is that surface which faces inwardly towards the remainder of said floating gate valve seat member, a concave arcuate profile being blended smoothly into the remainder of said floating gate valve seat member.

7. The gate valve according to claim 6 wherein said concave and convex arcuate profiles, respectively, of said inner and outer surfaces of said resilient limb, in cross-section, are concentric circular arcs.

8. The gate valve according to claim 1 wherein said resilient limb has a thickness which increases progressively towards said floating gate valve seat member.

9. The gate valve according to claim 1 wherein said floating gate valve seat member is provided with two said integral resilient seal elements disposed about the radially inner and outer regions of said floating gate valve seat member, said integral resilient seal elements being disposed about the same end of said floating gate valve seat member.

10. A gate valve which comprises:

a valve body;

a valve gate member movable slidably in said valve body;

fluid inlet and outlet flow passages in said valve body, said valve gate member being arranged for movement to selectively prevent and permit fluid flow between said fluid inlet and outlet flow passages;

and at least one gate valve seat member located in said valve body between said valve gate member and either said fluid inlet or outlet flow passage, said gate valve seat member being mounted in a floating manner in said valve body to form a floating gate valve seat member and having a first seal region arranged to make slidable sealing contact with said valve gate member and a second seal region arranged to make sealing contact internally with said valve body adjacent said respective flow passage; wherein the improvement is characterized in that:

said floating gate valve seat member incorporates an integral resilient seal element comprising, in cross-section, a resilient limb integral at one end with and spaced over its length from the remainder of said floating gate valve seat member, said resilient limb being arranged and adapted to make resilient sealing contact with said valve body and having an outer surface with an arcuate profile which is convex outwardly from said floating gate valve seat member and towards said valve body, and said resilient limb has at its free end an axially outwardly projecting region, arranged and adapted to contact a mating sealing surface of said valve body such that, in the relaxed state, said axially outwardly projecting region is the first portion of said resilient seal element to contact said mating sealing surface of said valve body.

11. The gate valve according to claim 10 wherein said floating gate valve seat member further comprises an abutment or stop surface, arranged and adapted to contact said mating sealing surface later than said axially outwardly projecting region, for limiting the deformation of said resilient limb.

12. A gate valve which comprises:

a valve body;

a valve gate member movable slidably in said valve body;

fluid inlet and outlet flow passages in said valve body, said valve gate member being arranged for movement to selectively prevent and permit fluid flow between said fluid inlet and outlet flow passages; and at least one gate valve seat member located in said valve body between said valve gate member and either said fluid inlet or outlet flow passage, said gate valve seat member being mounting in a floating manner in said valve body to form a floating gate valve seat member and having a first seal region arranged to make slidable sealing contact with said valve gate member and a second seal region arranged to make sealing contact internally with said valve body adjacent the respective fluid inlet or outlet flow passage; wherein the improvement is characterized in that:

said floating gate valve seat member incorporates an integral resilient seal element comprising, in cross-section, a resilient limb integral at one end with and spaced over its length from the remainder of said floating gate valve seat member, said resilient limb being arranged and adapted to make resilient sealing contact with said valve body and having an outer surface with an arcuate profile which is convex outwardly from said seat member and towards said valve body, and said resilient limb has a thickness which increases progressively towards said floating gate valve seat member.

13. The gate valve according to claim 12 wherein said resilient limb has on its inner surface, said inner surface being that surface which faces inwardly towards the remainder of said floating gate valve seat member, a concave arcuate profile being blended smoothly into the remainder of said floating gate valve seat member, said arcuate profiles of said inner and outer surfaces of said resilient limb, in cross-section, being concentric circular arcs.

14. A gate valve which comprises:

a valve body;

a valve gate member movable slidably in said valve body;

fluid inlet and outlet flow passages in said valve body, said valve gate member being arranged for movement to selectively prevent and permit fluid flow between said fluid inlet and outlet flow passages; and at least one gate valve seat member located in said valve body between said valve gate member and either of said fluid inlet or outlet flow passage, said gate valve seat member being mounted in a floating manner in said valve body to form a floating gate valve seat member and having a first seal region arranged to make slidable sealing contact with said valve gate member and a second seal region arranged to make sealing contact internally with said valve body adjacent the respective fluid inlet or outlet flow passage, wherein the improvement is characterized such that:

said floating gate valve seat member incorporates an integral resilient seal element comprising, in cross-section, a resilient limb integral at one end with and spaced over its length from the remainder of said floating gate valve seat member, said resilient limb being arranged and adapted to make resilient sealing contact with said valve body and having an outer surface with an arcuate profile which is convex outwardly from said floating gate valve seat member and towards said valve body, said resilient limb has at its free end an outwardly projecting region, arranged and adapted to contact a mating sealing surface of said valve body and to be the first portion of said resilient seal element to contact said mating sealing surface of said valve body, and said resilient limb having a thickness which increases progressively towards said floating gate valve seat member.

15. The gate valve according to claim 14 wherein said resilient limb has on its inner surface, said inner surface facing inwardly towards the remainder of said floating gate valve seat member, a concave arcuate profile being blended smoothly into the remainder of said floating gate valve seat member, and said arcuate profiles of said inner and outer surfaces of said resilient limb, in cross-section, are concentric circular arcs.

16. The gate valve according to claim 14 wherein said floating gate valve seat member further comprises an abutment or stop surface, arranged and adapted to contact said mating sealing surface later than said outwardly projecting region, for limiting the deformation of said resilient limb.

* * * * *